(12) United States Patent
Meguerditchian (10) Patent No.: US 7,669,869 B2
(45) Date of Patent: Mar. 2, 2010

(54) DRIVE APPARATUS

(76) Inventor: Ohannes Meguerditchian, 420 W. Windsor Rd., No. 24, Glendale, CA (US) 91204

( * ) Notice: Subject to any disclaimer, the term of this patent is extended or adjusted under 35 U.S.C. 154(b) by 297 days.

(21) Appl. No.: 11/938,241

(22) Filed: Nov. 9, 2007

(65) Prior Publication Data

US 2009/0121450 A1      May 14, 2009

(51) Int. Cl.
*B62M 1/04*          (2006.01)
(52) U.S. Cl. ...................................... 280/256; 280/253
(58) Field of Classification Search ................. 280/256, 280/253, 257, 221
See application file for complete search history.

(56) References Cited

U.S. PATENT DOCUMENTS

| | | | | |
|---|---|---|---|---|
| 3,906,807 A | * | 9/1975 | Trammell, Jr. ............... | 74/143 |
| 4,053,173 A | * | 10/1977 | Chase, Sr. .................... | 280/253 |
| 4,564,206 A | * | 1/1986 | Lenhardt ...................... | 280/252 |
| 5,405,157 A | * | 4/1995 | Bezerra et al. ............... | 280/253 |
| 7,111,860 B1 | * | 9/2006 | Grimaldos ................... | 280/253 |
| 7,510,201 B2 | * | 3/2009 | Scarborough ................ | 280/253 |
| 2002/0093171 A1 | * | 7/2002 | Chen ........................... | 280/253 |
| 2003/0193158 A1 | * | 10/2003 | Hung .......................... | 280/221 |
| 2006/0066072 A1 | * | 3/2006 | Scarborough ................ | 280/253 |
| 2008/0106061 A1 | * | 5/2008 | Meguerditchian ............ | 280/253 |

* cited by examiner

*Primary Examiner*—Lesley Morris
*Assistant Examiner*—Michael R Stabley
(74) *Attorney, Agent, or Firm*—Italia IP; James A. Italia (57) ABSTRACT

A drive apparatus for converting a substantially linear driving force to a rotary propulsive force, the apparatus including a pedal assembly for accepting a substantially linear drive force and fixed structure assembly for converting the substantially linear drive force to a rotary propulsive force.

20 Claims, 8 Drawing Sheets

DRIVE APPARATUS

BACKGROUND OF INVENTION

This application relates generally to a drive apparatus. More specifically, this application discloses a drive apparatus that converts a substantially linear driving force to a rotary propulsive force that may be used in a variety of applications such as to generate the propulsive force in a bicycle.

SUMMARY

This application discloses a drive apparatus for converting a substantially linear driving force to a rotary propulsive force. The apparatus is of simple construction and can be used in a variety of applications including in standard bicycles, tricycles, reclining bicycles, personal watercraft such as paddle boats, scooters and any other similar transportation apparatus that uses a rotational force as a means to propel the transportation apparatus forward.

In particular, this application discloses a drive apparatus for converting a substantially linear driving force to a rotary propulsive force, said apparatus comprising: a first and second pedal bracket, wherein each pedal bracket includes a pedal bracket axel attachment region and a link attachment region; a pedal bracket axel for pivotably attaching said first and second pedal brackets at said pedal bracket axel attachment region; a first and second link respectively pivotably attached at one end to said first and second pedal brackets at said link attachment region, and wherein each link includes a power shaft attachment region at the opposite end; a first and second power shaft respectively pivotably attached to said first and second links at said power shaft attachment region, and wherein said first power shaft includes a first drive arm attachment region at one end and a second drive arm attachment region at the opposite end, and wherein said second power shaft includes a second drive arm attachment region at one end and a power sprocket attachment region at the opposite end; a first and second drive arm, wherein said first drive arm is fixably attached to said first power shaft at said first drive arm attachment region at one end and includes a bearing axel attachment region at the opposite end, and wherein said second drive arm is fixably attached to said first power shaft at said second drive arm attachment region at one end and said second power shaft at said second drive arm attachment region at the opposite end; a bearing axel fixably attached to said first drive arm at said bearing axel attachment region; and, a power sprocket fixably attached to said second power shaft at said power sprocket attachment region, and wherein said power sprocket is mounted to a power sprocket axel for rotation of said power sprocket thereon.

This application also discloses a drive apparatus for converting a substantially linear driving force to a rotary propulsive force, said apparatus comprising: a first and second pedal bracket, wherein each pedal bracket includes a pedal bracket axel attachment region and a link attachment region; a pedal bracket axel for pivotably attaching said first and second pedal brackets at said pedal bracket axel attachment region; a first and second link respectively pivotably attached at one end to said first and second pedal brackets at said link attachment region, and wherein each link includes a power shaft attachment region at the opposite end; a first and second power shaft respectively pivotably attached to said first and second links at said power shaft attachment region, and wherein said first power shaft includes a first drive arm attachment region at one end and a second drive arm attachment region at the opposite end, and wherein said second power shaft includes a second drive arm attachment region at one end and a power sprocket attachment region at the opposite end; a first and second drive arm, wherein said first drive arm is fixably attached to said first power shaft at said first drive arm attachment region at one end and includes a bearing axel attachment region at the opposite end, and wherein said second drive arm is fixably attached to said first power shaft at said second drive arm attachment region at one end and said second power shaft at said second drive arm attachment region at the opposite end; a bearing axel fixably attached to said first drive arm at said bearing axel attachment region; a power sprocket fixably attached to said second power shaft at said power sprocket attachment region, and wherein said power sprocket is mounted to a power sprocket axel for rotation of said power sprocket thereon; wherein said pedal brackets are reciprocatingly linked to each other; wherein a center line extends from said bearing axel crosses substantially through the midpoint of the second drive arm; and, wherein the range of upward and downward motion of said pedal brackets is approximately 30° to approximately 70°.

This application further discloses a drive apparatus for converting a substantially linear driving force to a rotary propulsive force, said apparatus comprising: a first and second pedal bracket, wherein each pedal bracket includes a pedal bracket axel attachment region, a link attachment region, and pedal attachment regions for attachment of pedals thereto; a pedal bracket axel for pivotably attaching said first and second pedal brackets at said pedal bracket axel attachment region; a first and second link respectively pivotably attached at one end to said first and second pedal brackets at said link attachment region, and wherein each link includes a power shaft attachment region at the opposite end; a first and second power shaft respectively pivotably attached to said first and second links at said power shaft attachment region, and wherein said first power shaft includes a first drive arm attachment region at one end and a second drive arm attachment region at the opposite end, and wherein said second power shaft includes a second drive arm attachment region at one end and a power sprocket attachment region at the opposite end; a first and second drive arm, wherein said first drive arm is fixably attached to said first power shaft at said first drive arm attachment region at one end and includes a bearing axel attachment region at the opposite end, and wherein said second drive arm is fixably attached to said first power shaft at said second drive arm attachment region at one end and said second power shaft at said second drive arm attachment region at the opposite end; a bearing axel fixably attached to said first drive arm at said bearing axel attachment region; a power sprocket fixably attached to said second power shaft at said power sprocket attachment region, and wherein said power sprocket is mounted to a power sprocket axel for rotation of said power sprocket thereon; wherein said pedal brackets are reciprocatingly linked to each other; wherein when a pedal reaches its lowest point, said power sprocket has been rotated substantially 180° from its position when the pedal was at its highest point; wherein a center line extends from said bearing axel crosses substantially through the midpoint of the second drive arm and passes through substantially the center of said power sprocket axel; and, wherein the range of upward and downward motion of said pedal brackets is approximately 30° to approximately 70°.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
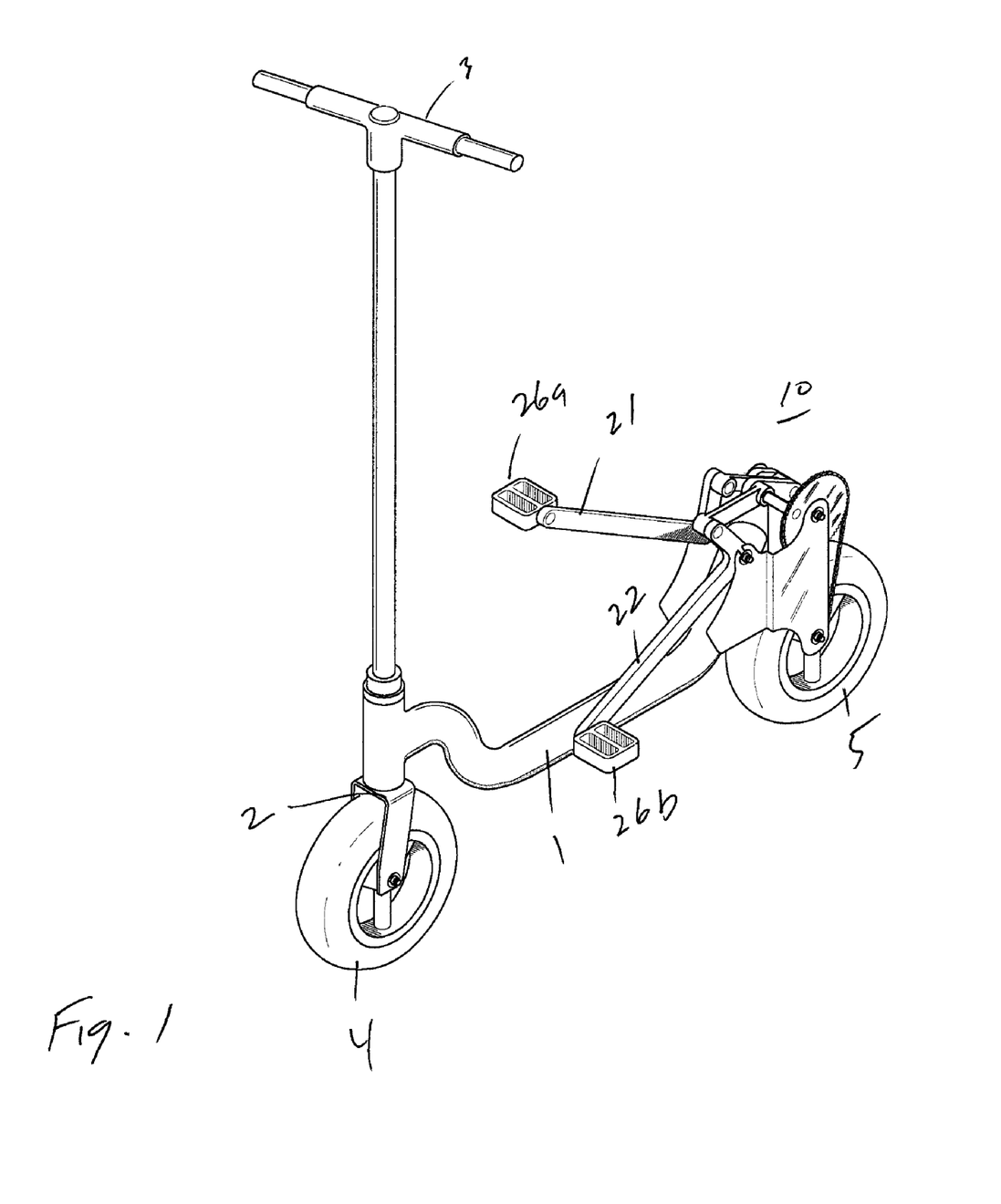
FIG. 1 is a perspective view of the drive apparatus disclosed herein incorporated on a bicycle.
Figure 2:
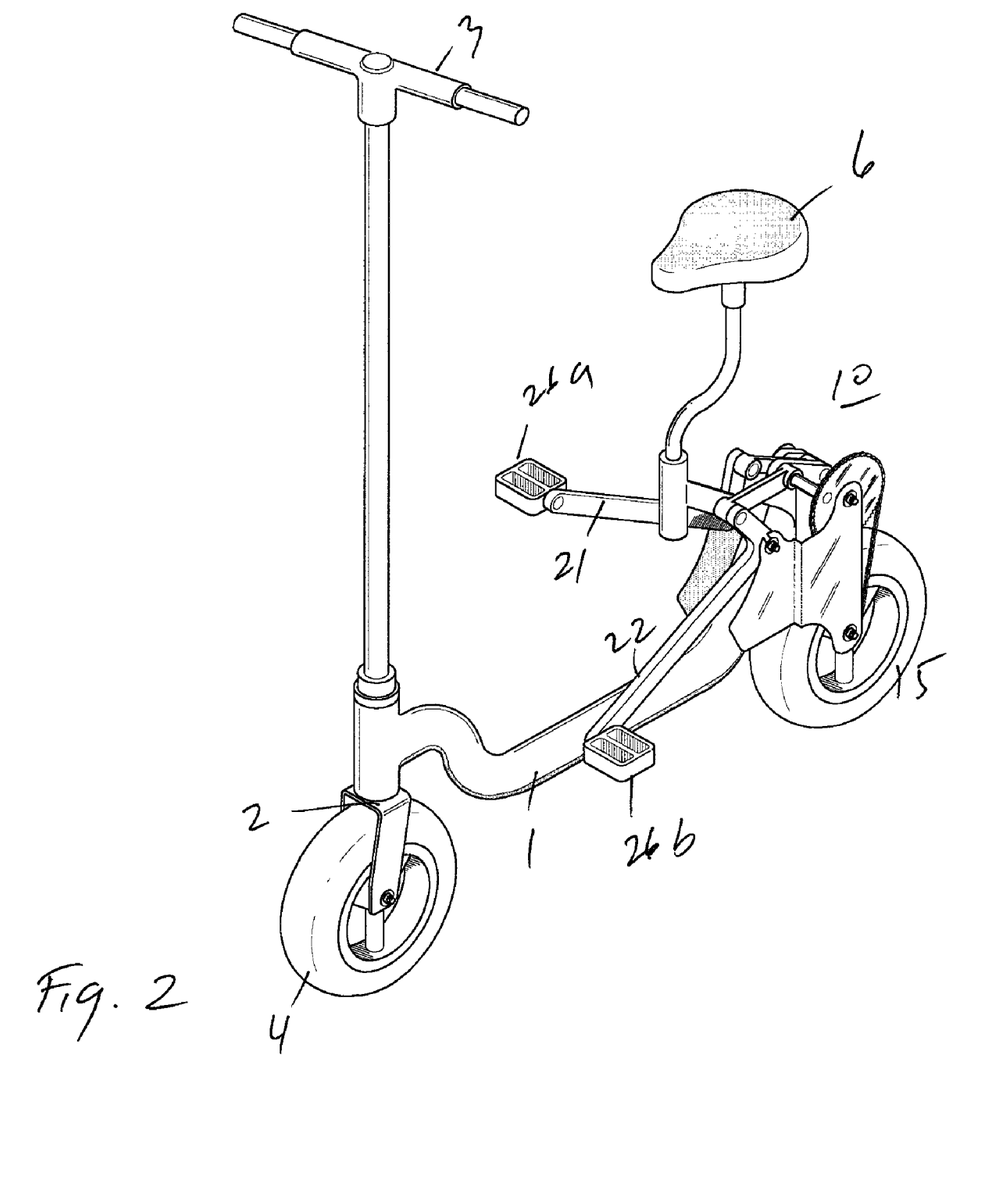
FIG. 2 is a perspective view of the drive apparatus disclosed herein incorporated on a bicycle shown with a seat.
Figure 3:
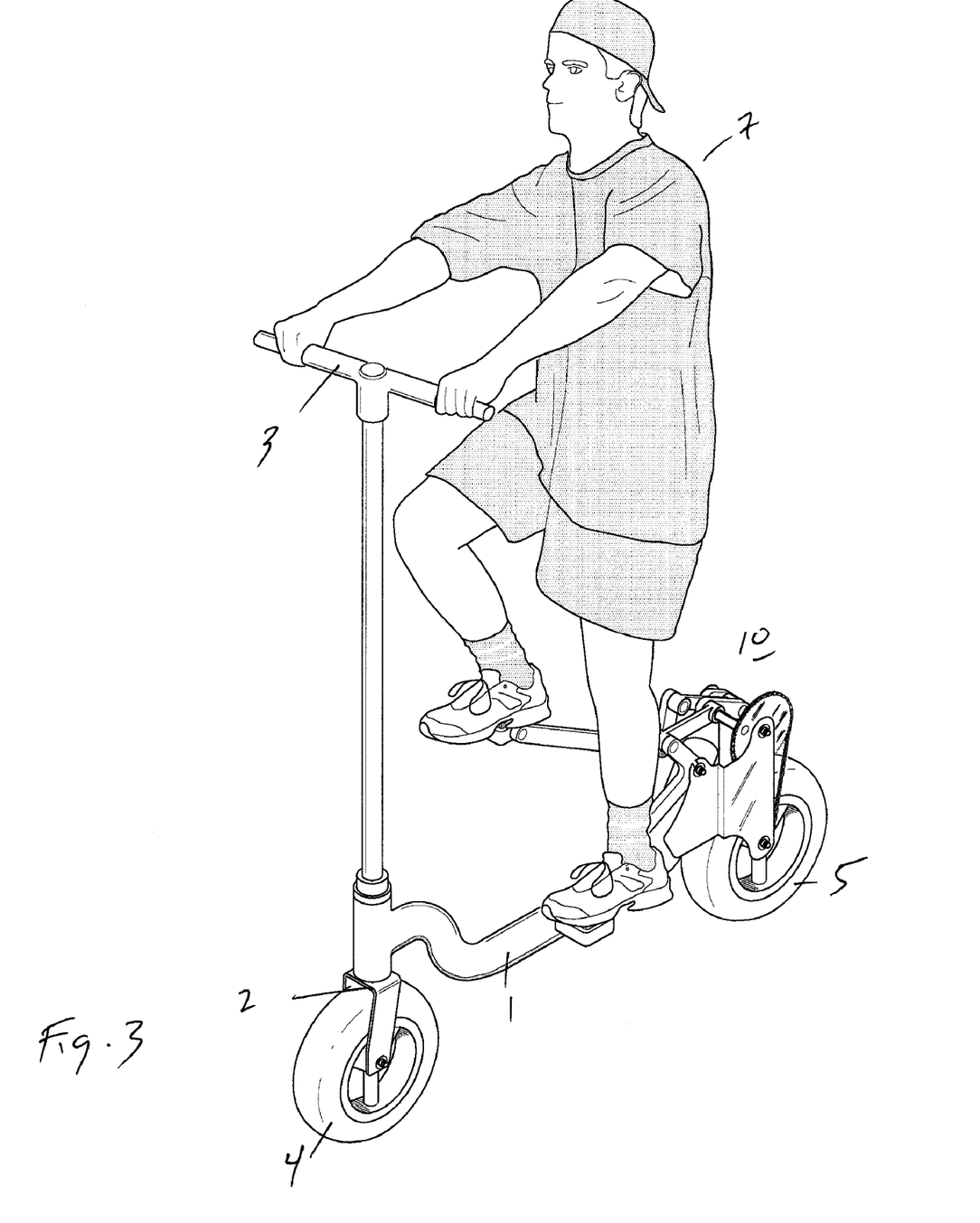
FIG. 3 is a perspective view of the drive apparatus disclosed herein incorporated on a bicycle shown with a representative rider.

Referring to FIGS. 1-3, shown therein and generally designated by the reference character 10 is an embodiment of the drive apparatus 10 constructed in accordance with the following description. The drive apparatus 10 is shown incorporated in a bicycle, however, it should be appreciated that the drive apparatus may be incorporated in a scooter, a tricycle, a reclining bicycle or any other similar transportation device that utilizes a rider's "peddling" motion to propel the transportation device in a desired direction. Regardless of the nature of the transportation device, which are well known in the art, and shown for example purposes only, each is generally characterized by having a frame 1 that includes a front forks 2, handle bars 3, and front 4 and rear 5 wheels. A seat assembly 6, as is well known in the art, may also be included and attached to the frame 1. See also FIG. 3 showing an example of a rider 7 positioned on the bicycle in FIG. 1

Figure 4:
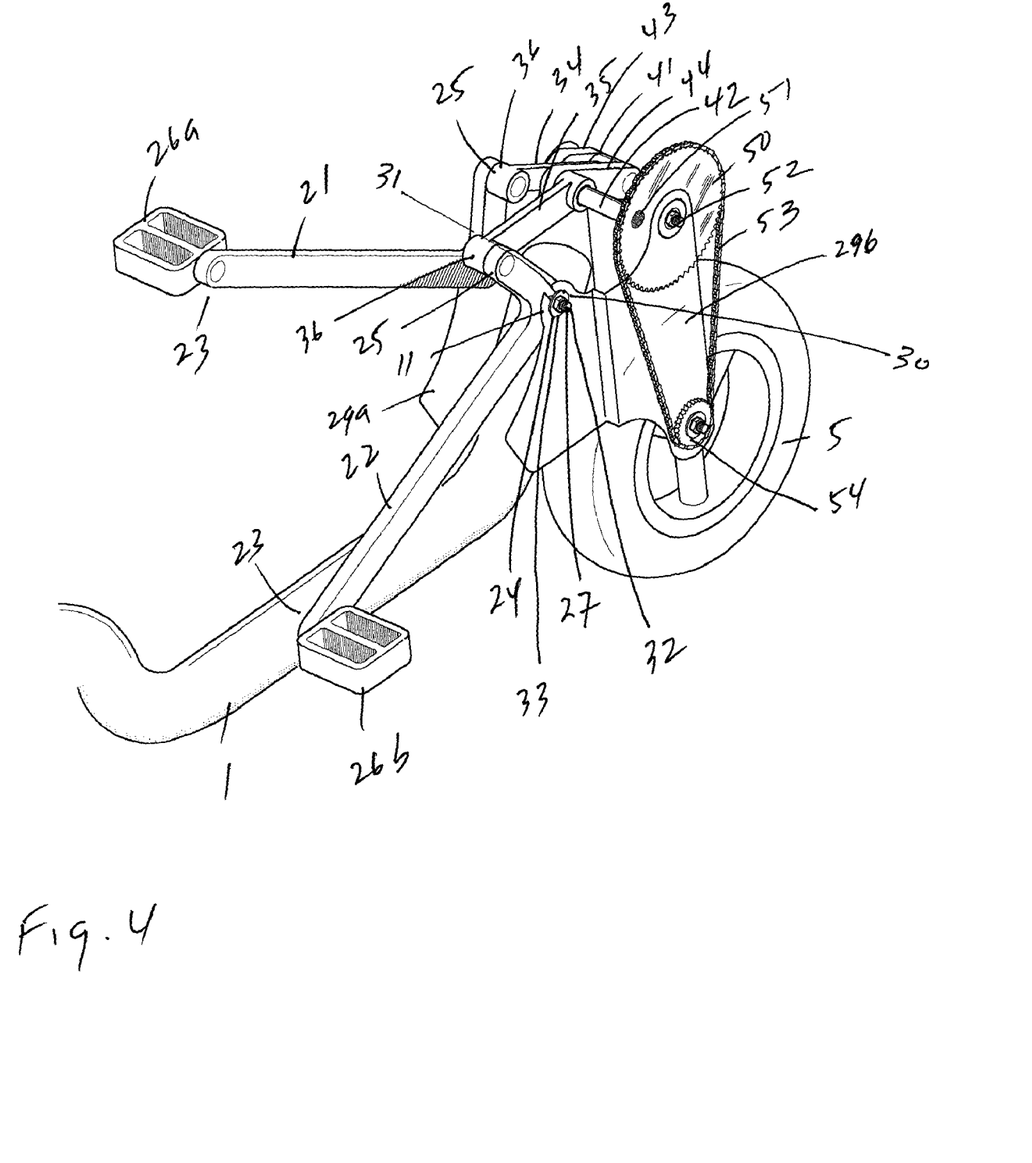
FIG. 4 is an enlarged fragmentary perspective view of the drive apparatus in FIG. 1.
Figure 5:
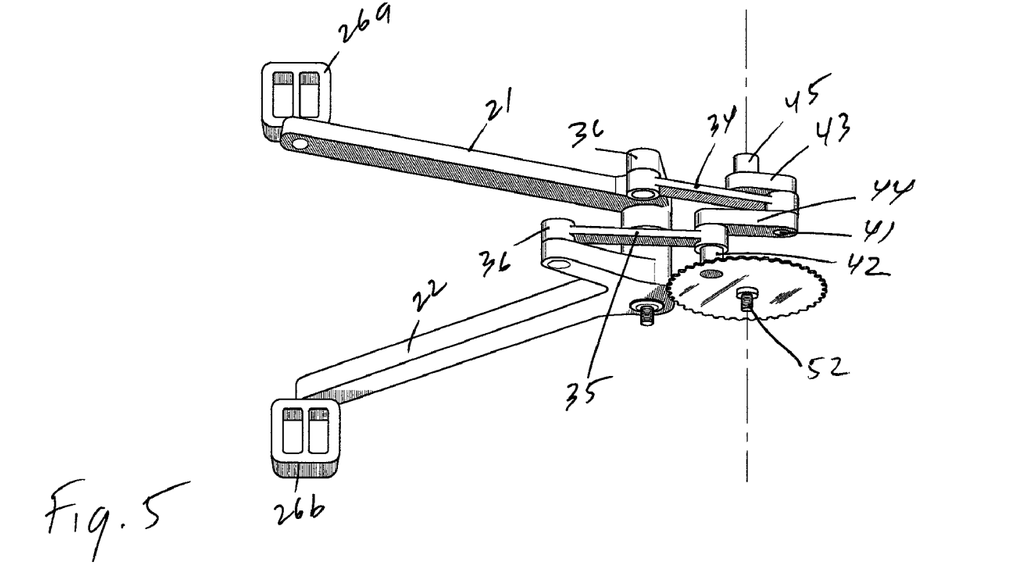
FIG. 5 is a top perspective view of the drive apparatus in FIG. 1.
Figure 6:
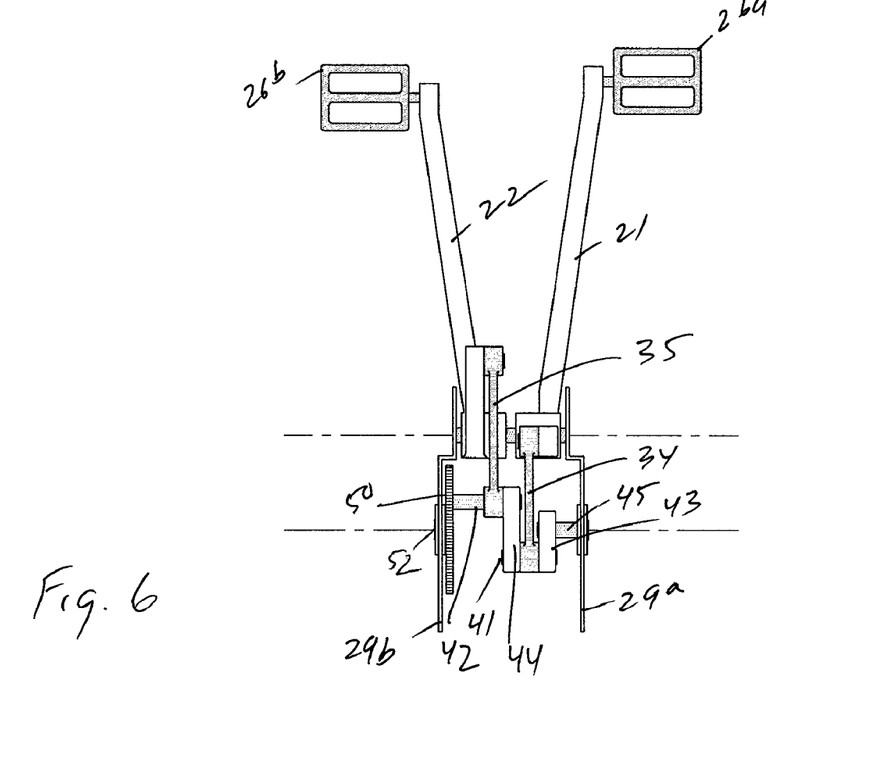
FIG. 6 is a top plan view of the drive apparatus in FIG. 1.
Figure 9:
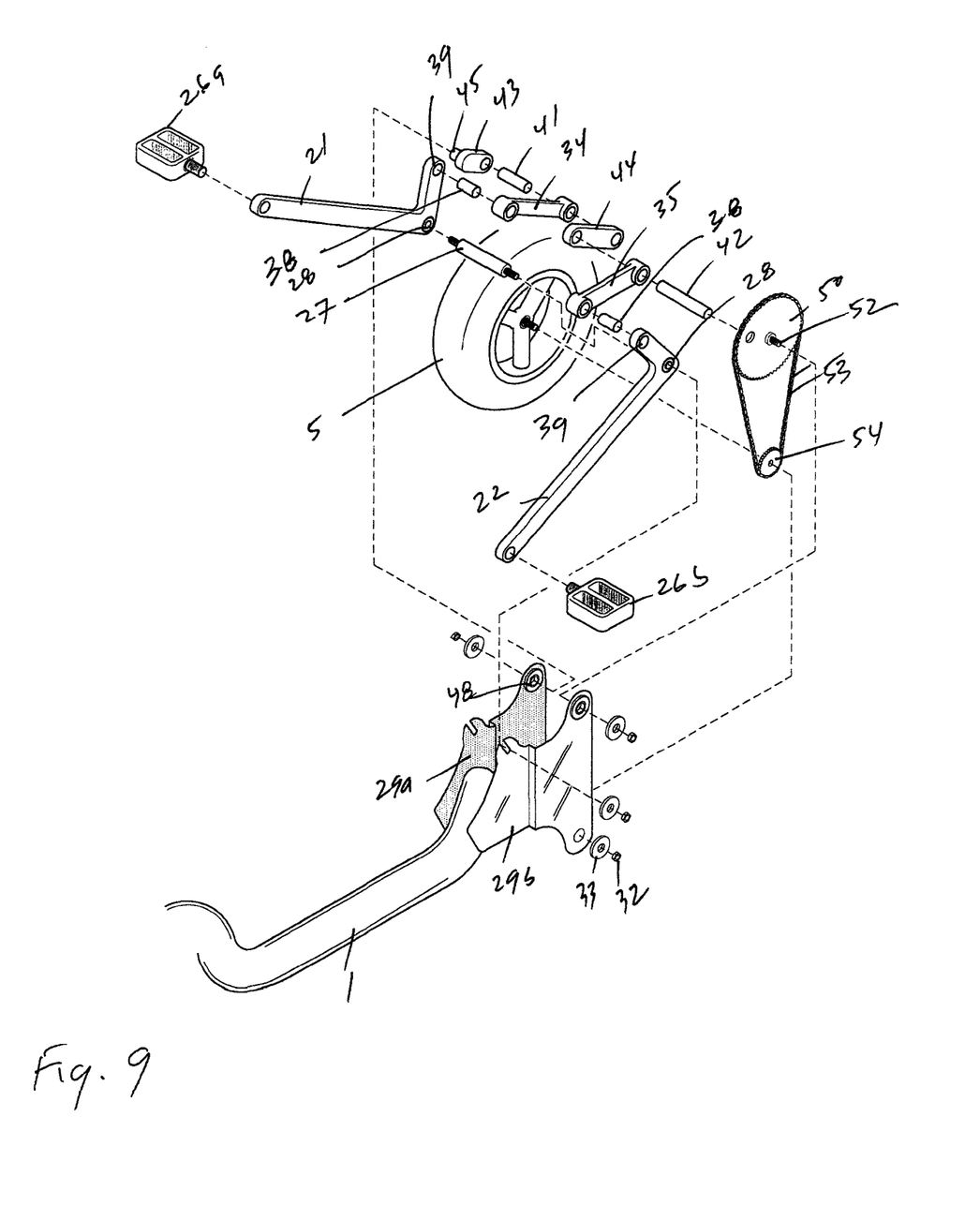

Referring now to FIGS. 4-6, the drive apparatus 10 includes a first 21 and second pedal bracket 22. Each pedal bracket 21 and 22 includes a pedal attachment region 23 for attachment of pedals 26a and 26b, a pedal bracket axel attachment region 24, and a link attachment region 25. The pedal brackets 21 and 22 are mounted at the pedal bracket axel attachment region 24 on a pedal bracket axel 27, more specifically on bearings 28, such that each pedal bracket is able to freely pivot independently on said pedal bracket axel 27. See FIG. 6. The pedal bracket axel 27 is attached to the bicycle using a pair of plates 29a and 29b fixably mounted on each side of the bike. The plates 29 include pedal bracket axle attachment regions 30 that include a slot 31 to slideably engage the pedal bracket axel 27. The pedal bracket axel 27 is then secured with a pair of bolts 32 and a pair of washers 33 or any other suitable means. See also FIG. 9.

The first 21 and second 22 pedal brackets are pivotably attached respectively to a first 34 and second 35 link at the link attachment region 25 using shaft 38 and bore 39 assemblies. The first 34 and second 35 links are of the same size and shape and include a pedal bracket attachment region 36 at one end. The first link 34 continues and is pivotably attached to a first power shaft 41 via a bore 39 at the other end. Likewise, the second link 35 continues and is pivotably attached to a second power shaft 42 at the opposite end of the link 35 via a bore 39. See also FIG. 9.

The first 21 and second 22 pedal brackets are reciprocatingly linked to each other (such that when one pedal bracket is depressed, the other rises, and vice versa) through the association with the first 43 and second 44 drive arms. The first drive arm 43 is fixably attached to the first power shaft 41 at one end and fixably attached to a bearing axel 45 at the other. The bearing axel 45 engages the first plate 29a at the bearing axel attachment region 46, and is secured with a bolt 32 and washer 33. The bearing axel attachment region 46 includes a bore that includes a bearing 48 retained therein for rotatably receiving the end of the bearing axel 45 that is opposite the end fixably attached to the first drive arm 43. See also FIG. 9. The second drive arm 44 is fixably attached to the second power shaft 42 at one end and fixably attached to the first power shaft 41 at the other. The second power shaft 42 continues and is fixably attached to the power sprocket 50 at the second power shaft attachment region 51. The power sprocket 50 is attached to a sprocket axel 52 that is retained on the second plate 29b at the sprocket axel attachment region 49 and is secured with a bolt 32 and washer 33. The sprocket axel attachment region 49 includes a bore that includes a bearing 48 retained therein for rotatably receiving the sprocket axel 52. The power sprocket 50 is linked with a chain 53 to a drive sprocket 54 for propulsion of the rear wheel 5.

Certain inter-relationships of the components of the drive apparatus 10 can be better understood with reference to FIGS. 5 and 6. Namely, the first 43 and second 44 drive arms are sized and configured such that a center line that extends from the bearing axel 45 crosses substantially through the midpoint of the of the second drive arm 44 and continues and passes substantially through the center of the power sprocket axel 52. Thus, the sprocket axel 52 and bearing axel 45 share substantially the same axis of rotation. Further, as the assembly of the drive apparatus 10 was described, it should be appreciated that a portion of the components are fixably attached to one another in succession such that a fixed structure is created and maintained during the different positions of the drive apparatus. The fixed structure begins with the bearing axle 45 being fixed to one end of the first drive arm 43, the opposite end of the first drive arm 43 is then fixed to a first end of the first power shaft 41. The opposite end of the first power shaft 41 is then fixed to one end of the second drive arm 44. The opposite end of the second drive arm 44 is then fixed to the first end of the second power shaft 42. The opposite end of the second power shaft 42 is then fixed to the power sprocket 50. As used herein, the term "fixed" of "fixably attached" means that each attached component is unable to move independently of the other. Thus, if the bearing axel 45 is rotated in a given direction, the intermediate components just described also rotate in the same direction resulting in the power sprocket 50 rotating in the same direction. The relationship just described is referred to herein as the "fixed structure." This fixed structure is utilized during operation of the drive apparatus 10 as described below.

Figure 7:
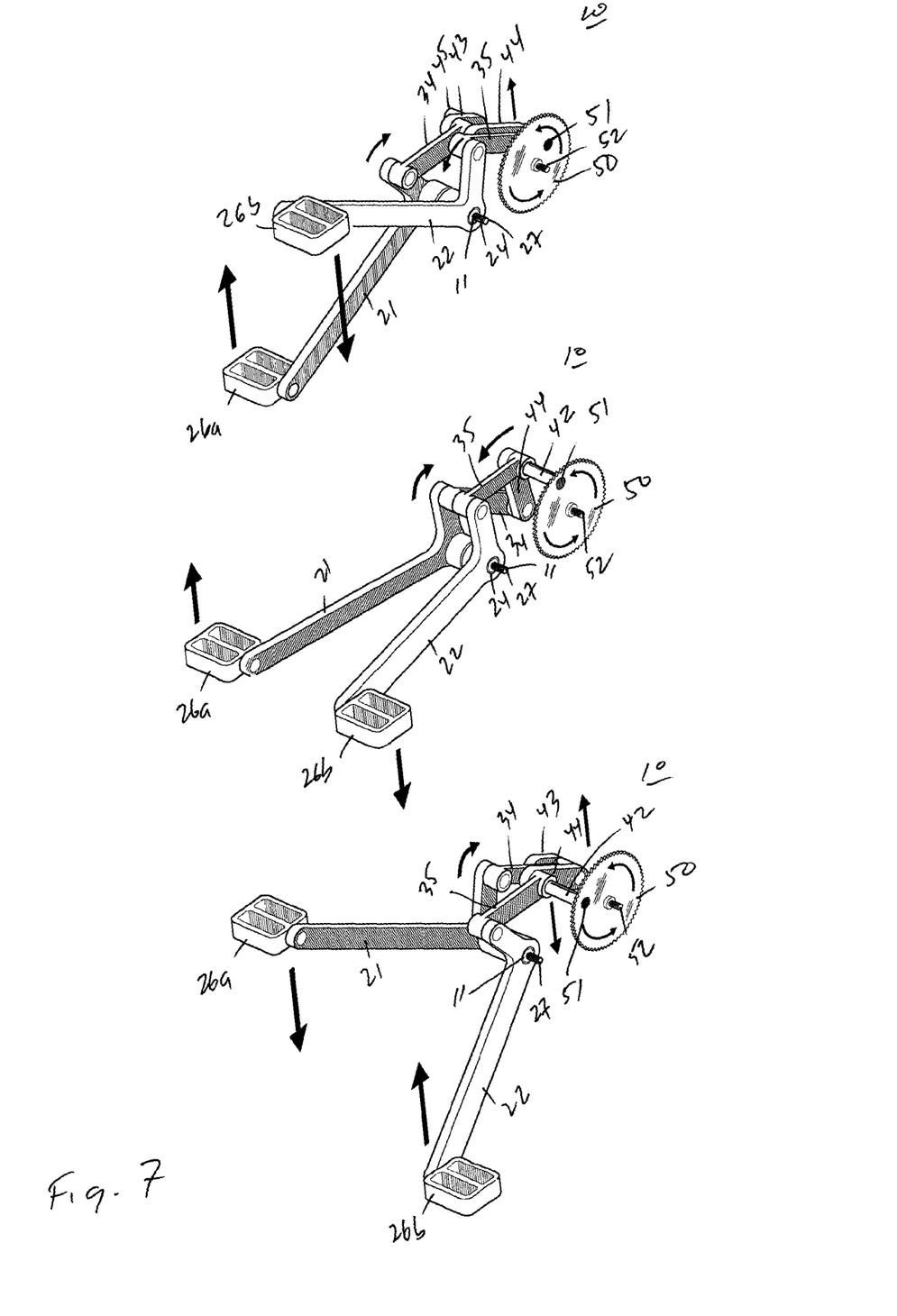
FIG. 7 shows a perspective view of the drive apparatus in FIG. 1 at various positions.
Figure 8:
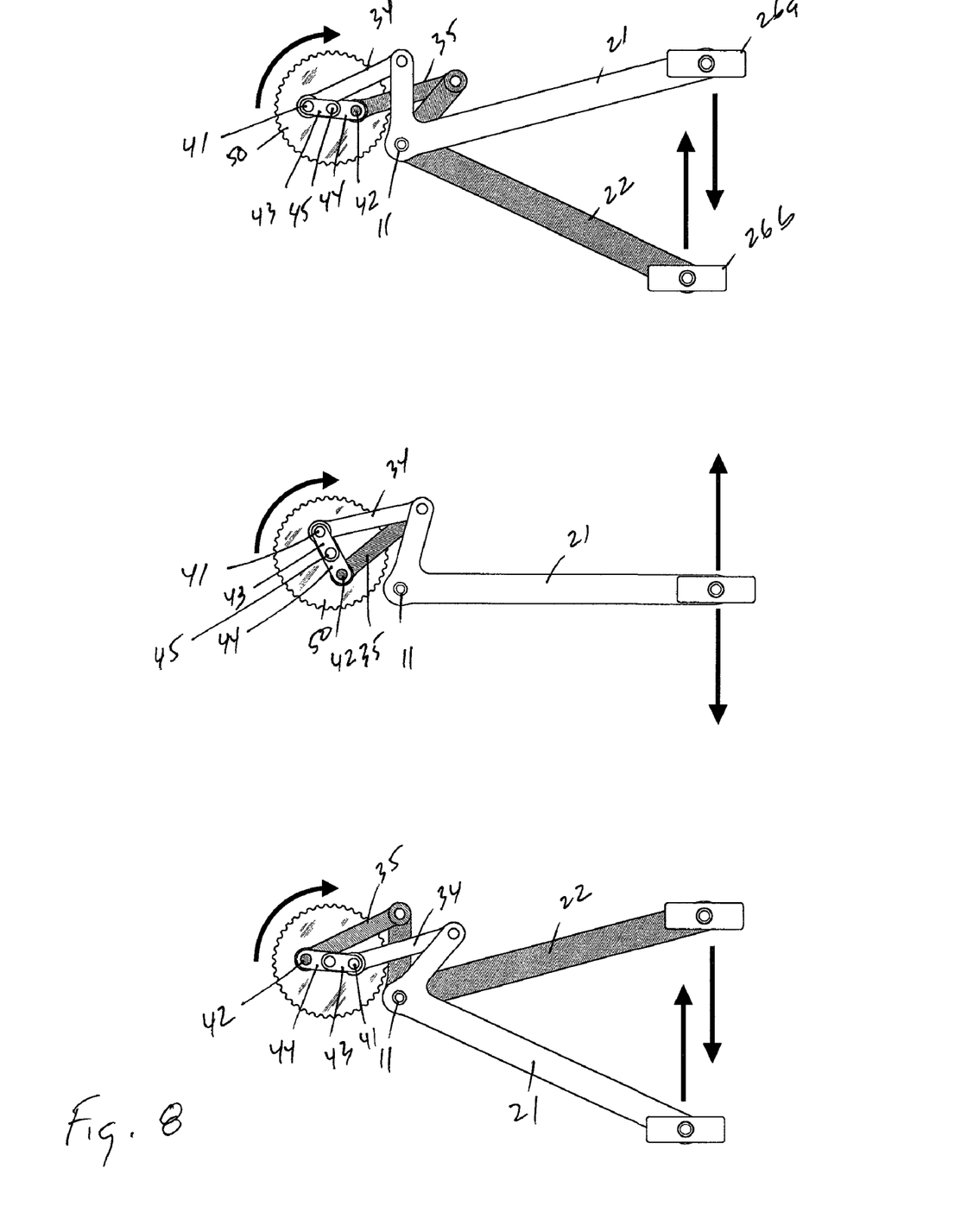
FIG. 8 shows a side plan view of the drive apparatus in FIG. 1 at various positions; and, FIG. 9 is an exploded view of the drive apparatus in FIG. 1.

During operation of the drive apparatus 10 the following events take place in converting a substantially linear driving force to a rotary propulsive force. Referring to FIGS. 7 and 8, the drive apparatus 10 is shown at various positions of the propulsive force. As shown in FIG. 3, a rider 7 places his or her feet on the pedals 26a and 26b attached respectively to the pedal brackets 21 and 22. The pedal brackets 21 and 22 act as a lever arms about a common pivot point 11 upon the pedal bracket axel 27. When the rider pushes down on, for example the first pedal 26a (FIG. 8), the foot travels downward in a substantially linear direction, in this example, a substantially vertical direction. This in turn causes the first pedal bracket 21 to rotate about the pivot point 11 on the pedal bracket axel 27. This in turn creates a rotational pulling force on the first link 34, which directly pulls on the first power shaft 41 and causes the fixed structure to rotate in the forward direction and thereby create a propulsive force to the power sprocket 50. This propulsive force is generated through substantially the entire downward travel of the pedal 26a. Once the first pedal 26a reaches its lowest point, the power sprocket 50 has been rotated substantially 180° from its position when the pedal 26a was at its highest point. The downward force of the first pedal 26a causes the second pedal 26b to reciprocate upwards and become available for another downward stroke by the rider. Again, when the second pedal 26b is pushed downward in a substantially vertical direction, this in turn causes the second pedal bracket 22 to rotate about the pivot point 11 on the pedal bracket axel 27. See FIG. 7. This in turn creates a rotational pulling force on the second link 35, which directly pulls on the second power shaft 42 and causes the fixed structure to rotate in the forward direction and thereby create a propulsive force to the power sprocket 50. And again, this propulsive force is generated through substantially the entire downward travel of the second pedal 26b. Likewise, once the second pedal 26b reaches its lowest point, the power sprocket 50 has been rotated another 180° from its position when the second pedal 26b was at it highest point. This reciprocal motion of drive apparatus 10 creates a constant propulsive force on the power sprocket 50, which in turn drives the chain 53, the drive sprocket 54, and of course the rear wheel 5. As mentioned previously, the first 34 and second links 35 are rotatably attached to their respective components such that they are able to rotate around them.

The range of upward and downward motion of each pedal bracket 21 and 22 can be up to 180°, but preferably approximately 30° to approximately 70°, however, a range of approximately 40° to approximately 60° is particularly preferred.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A drive apparatus for converting a substantially linear driving force to a rotary propulsive force, said apparatus comprising:
   a first and second pedal bracket, wherein each pedal bracket includes a pedal bracket axle attachment region and a link attachment region;
   a pedal bracket axle for pivotably attaching said first and second pedal brackets at said pedal bracket axle attachment region;
   a first and second link respectively pivotably attached at one end to said first and second pedal brackets at said link attachment region, and wherein each link includes a power shaft attachment region at the opposite end;
   a first and second power shaft respectively pivotably attached to said first and second links at said power shaft attachment region, and wherein said first power shaft includes a first drive arm attachment region at one end and a second drive arm attachment region at the opposite end, and wherein said second power shaft includes a second drive arm attachment region at one end and a power sprocket attachment region at the opposite end;
   a first and second drive arm, wherein said first drive arm is fixably attached to said first power shaft at said first drive arm attachment region at one end and includes a bearing axle attachment region at the opposite end, and wherein said second drive arm is fixably attached to said first power shaft at said second drive arm attachment region at one end and said second power shaft at said second drive arm attachment region at the opposite end;
   a bearing axle fixably attached to said first drive arm at said bearing axle attachment region; and,
   a power sprocket fixably attached to said second power shaft at said power sprocket attachment region, and wherein said power sprocket is mounted to a power sprocket axle for rotation of said power sprocket thereon.

2. The apparatus of claim 1 further comprising a drive sprocket functionally linked to said power sprocket by a chain means such that when said power sprocket rotates, said drive sprocket rotates.

3. The apparatus of claim 1 wherein the pedal brackets further comprise pedal attachment regions for attachment of pedals thereto.

4. The apparatus of claim 1 wherein a center line extends from said bearing axle crosses substantially through the midpoint of the second drive arm.

5. The apparatus of claim 1 wherein a center line extends from said bearing axle passes substantially through the center of the power sprocket axle.

6. The apparatus of claim 1 wherein a center line extends from said bearing axle crosses substantially through the midpoint of the second drive arm and passes through substantially the center of said power sprocket axle.

7. The apparatus of claim 1 wherein the range of upward and downward motion of said pedal brackets is approximately 30° to approximately 70°.

8. The apparatus of claim 1 further comprising means to attach said drive apparatus to a transportation apparatus frame.

9. The apparatus of claim 1 wherein said pedal brackets are reciprocatingly linked to each other.

10. The apparatus of claim 3 wherein when a pedal reaches its lowest point, said power sprocket has been rotated substantially 180° from its position when the pedal was at its highest point.

11. The apparatus of claim 7, wherein the range of upward and downward motion of said pedal brackets is approximately 40° to approximately 60°.

12. A drive apparatus for converting a substantially linear driving force to a rotary propulsive force, said apparatus comprising:
   a first and second pedal bracket, wherein each pedal bracket includes a pedal bracket axle attachment region and a link attachment region;
   a pedal bracket axle for pivotably attaching said first and second pedal brackets at said pedal bracket axle attachment region;
   a first and second link respectively pivotably attached at one end to said first and second pedal brackets at said link attachment region, and wherein each link includes a power shaft attachment region at the opposite end;
   a first and second power shaft respectively pivotably attached to said first and second links at said power shaft attachment region, and wherein said first power shaft includes a first drive arm attachment region at one end and a second drive arm attachment region at the opposite end, and wherein said second power shaft includes a second drive arm attachment region at one end and a power sprocket attachment region at the opposite end;

a first and second drive arm, wherein said first drive arm is fixably attached to said first power shaft at said first drive arm attachment region at one end and includes a bearing axle attachment region at the opposite end, and wherein said second drive arm is fixably attached to said first power shaft at said second drive arm attachment region at one end and said second power shaft at said second drive arm attachment region at the opposite end;

a bearing axle fixably attached to said first drive arm at said bearing axle attachment region;

a power sprocket fixably attached to said second power sprocket at said power sprocket attachment region, and wherein said power sprocket is mounted to a power sprocket axle for rotation of said power sprocket thereon;

wherein said pedal brackets are reciprocatingly linked to each other;

wherein a center line extends from said bearing axle crosses substantially through the midpoint of the second drive arm; and, wherein the range of upward and downward motion of said pedal brackets is approximately 30° to approximately 70°.

13. The apparatus of claim 12 wherein the pedal brackets further comprise pedal attachment regions for attachment of pedals thereto.

14. The apparatus of claim 13 wherein when a pedal reaches its lowest point, said power sprocket has been rotated substantially 180° from its position when the pedal was at its highest point.

15. The apparatus of claim 12 wherein a center line extends from said bearing axle passes substantially through the center of the power sprocket axle.

16. The apparatus of claim 15 wherein the range of upward and downward motion of said pedal brackets is approximately 40° to approximately 60°.

17. A drive apparatus for converting a substantially linear driving force to a rotary propulsive force, said apparatus comprising:

a first and second pedal bracket, wherein each pedal bracket includes a pedal bracket axle attachment region, a link attachment region, and pedal attachment regions for attachment of pedals thereto;

a pedal bracket axle for pivotably attaching said first and second pedal brackets at said pedal bracket axle attachment region;

a first and second link respectively pivotably attached at one end to said first and second pedal brackets at said link attachment region, and wherein each link includes a power shaft attachment region at the opposite end;

a first and second power shaft respectively pivotably attached to said first and second links at said power shaft attachment region, and wherein said first power shaft includes a first drive arm attachment region at one end and a second drive arm attachment region at the opposite end, and wherein said second power shaft includes a second drive arm attachment region at one end and a power sprocket attachment region at the opposite end;

a first and second drive arm, wherein said first drive arm is fixably attached to said first power shaft at said first drive arm attachment region at one end and includes a bearing axle attachment region at the opposite end, and wherein said second drive arm is fixably attached to said first power shaft at said second drive arm attachment region at one end and said second power shaft at said second drive arm attachment region at the opposite end;

a bearing axle fixably attached to said first drive arm at said bearing axle attachment region;

a power sprocket fixably attached to said second power shaft at said power sprocket attachment region, and wherein said power sprocket is mounted to a power sprocket axle for rotation of said power sprocket thereon;

wherein said pedal brackets are reciprocatingly linked to each other;

wherein when a pedal reaches its lowest point, said power sprocket has been rotated substantially 180° from its position when the pedal was at its highest point;

wherein a center line extends from said bearing axle crosses substantially through the midpoint of the second drive arm and passes through substantially the center of said power sprocket axle; and, wherein the range of upward and downward motion of said pedal brackets is approximately 30° to approximately 70°.

18. The apparatus of claim 17 further comprising a drive sprocket functionally linked to said power sprocket by a chain means such that when said power sprocket rotates, said drive sprocket rotates.

19. The apparatus of claim 18 further comprising means to attach said drive apparatus to a transportation apparatus frame.

20. The apparatus of claim 19 wherein the range of upward and downward motion of said pedal brackets is approximately 40° to approximately 60°.

* * * * *